US008769592B2

(12) United States Patent
Zhou et al.

(10) Patent No.: US 8,769,592 B2
(45) Date of Patent: Jul. 1, 2014

(54) UNIFIED MANAGEMENT METHOD AND SYSTEM FOR CHANNEL SERVICE AS WELL AS SERVICES ON DEMAND OF STREAM MEDIA

(75) Inventors: Lei Zhou, Shenzhen (CN); Shan Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 278 days.

(21) Appl. No.: 13/258,422

(22) PCT Filed: Dec. 23, 2009

(86) PCT No.: PCT/CN2009/075915
§ 371 (c)(1),
(2), (4) Date: Nov. 25, 2011

(87) PCT Pub. No.: WO2010/139172
PCT Pub. Date: Dec. 9, 2010

(65) Prior Publication Data
US 2012/0090013 A1 Apr. 12, 2012

(30) Foreign Application Priority Data
Jun. 3, 2009 (CN) .......................... 2009 1 0085868

(51) Int. Cl.
*H04N 7/173* (2011.01)
*H04L 12/56* (2006.01)
*H04L 29/06* (2006.01)

(52) U.S. Cl.
CPC ........... *H04L 47/801* (2013.01); *H04L 65/4084* (2013.01); *H04L 65/608* (2013.01)
USPC ................... 725/95; 725/91; 725/93; 725/96; 725/98; 725/100

(58) Field of Classification Search
USPC .................................................. 725/74–104
See application file for complete search history.

(56) References Cited

U.S. PATENT DOCUMENTS 6,654,901 B1 * 11/2003 Nakai et al. ....................... 714/1
8,452,885 B2 * 5/2013 Sherer et al. ................... 709/231
(Continued)

FOREIGN PATENT DOCUMENTS

CN 101420603 A 4/2009
CN 101583018 A 11/2009
(Continued)

OTHER PUBLICATIONS

International Search Report in international application No. PCT/CN2009/075915, mailed on Apr. 1, 2010.
(Continued)

*Primary Examiner* — Mushfikh Alam
(74) *Attorney, Agent, or Firm* — Oppedahl Patent Law Firm LLC (57) ABSTRACT

The present invention provides a unified management method system for channel service as well as service on demand of stream media, which belong to the management technology of stream media service. The method comprises: receiving, by a service processing unit, an instruction of creating a channel, obtaining channel resource required by a channel service from a stream media service unit according to the instruction of creating a channel, and performing control interaction on the stream media service unit where the channel resource is located; receiving, by a service processing unit, an RTSP request, obtaining resource on demand required by a service on demand according to the RTSP request, and performing control interaction on a stream media service unit where the resource on demand is located, thereby realizing unified resource management of channel service and service on demand.

8 Claims, 5 Drawing Sheets

(56) References Cited

U.S. PATENT DOCUMENTS

| | | | |
|---|---|---|---|
| 8,479,242 B1 * | 7/2013 | Chen et al. | 725/96 |
| 2008/0104647 A1 * | 5/2008 | Hannuksela | 725/114 |
| 2008/0115168 A1 * | 5/2008 | Adwankar et al. | 725/46 |
| 2008/0141307 A1 * | 6/2008 | Whitehead | 725/46 |
| 2009/0106803 A1 * | 4/2009 | Chen et al. | 725/103 |
| 2009/0144786 A1 * | 6/2009 | Branam et al. | 725/109 |
| 2009/0172751 A1 * | 7/2009 | Aldrey et al. | 725/87 |
| 2009/0248872 A1 * | 10/2009 | Luzzatti et al. | 709/226 |
| 2009/0320072 A1 * | 12/2009 | McClanahan et al. | 725/47 |
| 2010/0011103 A1 * | 1/2010 | Luzzatti et al. | 709/226 |
| 2010/0064307 A1 * | 3/2010 | Malhotra et al. | 725/24 |
| 2011/0023071 A1 * | 1/2011 | Li et al. | 725/87 |
| 2011/0083153 A1 * | 4/2011 | Cedervall et al. | 725/88 |

FOREIGN PATENT DOCUMENTS

| | | |
|---|---|---|
| WO | 2007110865 A1 | 4/2007 |
| WO | 2008060914 A2 | 5/2008 |
| WO | 2008070478 A1 | 6/2008 |

OTHER PUBLICATIONS

English Translation of the Written Opinion of the International Search Authority in international application No. PCT/CN2009/075915, mailed on Apr. 1, 2010.

* cited by examiner

UNIFIED MANAGEMENT METHOD AND SYSTEM FOR CHANNEL SERVICE AS WELL AS SERVICES ON DEMAND OF STREAM MEDIA

TECHNICAL FIELD

The present invention relates to the management technology of stream media services, and particularly to a unified management method and system for channel service as well as service on demand of stream media.

BACKGROUND

Internet Protocol TeleVision (IPTV) is a novel technology for providing various interactive services including digital television for home users by using broadband cable television network integrated with various technologies, such as Internet, multimedia, communication and the like.

IPTV services comprise channel services and services on demand. The channel services enable all users to watch the same content at the same time, comprising: ordinary live channels, carousel channels, and time-shift channels, and it is necessary to depend on these channels when users watch live programs. The services on demand enable each user to freely perform fast forward, fast rewind, and positioning play operation respectively. The services on demand comprise: Video On Demand (VOD), True Video On Demand (TVOD), and Time Shift TeleVision (TSTV) on demand on the time-shift channel of the user.

At present, when the channel service is processed, it only needs to perform simple code stream copy and distribution, and when the code stream needs to be processed, it generally further relies on a specific transcoding server. While a service on demand is processed, it needs to perform file access, play control, and code stream distribution control. Based on the above two different processing manners, the prior practice generally adopts a solution of separating the basic units of the channel service from the basic units of the service on demand, namely, adopting different software architecture, even different hardware architecture. In terms of cost, two different designs will inevitably increase the R&D costs and maintenance costs.

SUMMARY

To solve the above problem, the present invention aims to provide a unified management method and system for channel service as well as service on demand of stream media, which can realize unified resource management of channel service and service on demand.

To solve the above problem, the present invention provides a unified management method for channel service as well as service on demand of stream media, which is applied to a stream media system comprising a service processing unit and a plurality of stream media service units, wherein the method comprises:

receiving, by the service processing unit, an instruction of creating a channel, obtaining channel resource required by a channel service from a stream media service unit according to the instruction of creating a channel, and performing control interaction on the stream media service unit where the channel resource is located;

receiving, by the service processing unit, a Real Time Streaming Protocol (RTSP) request, obtaining resource on demand required by a service on demand according to the RTSP request, and performing control interaction on a stream media service unit where the resource on demand is located.

Preferably, the service processing unit may comprise: a resource management module, a channel management module, and a user management module;

the step of obtaining the channel resource required by the channel service and performing control interaction on the stream media service unit where the channel resource is located may comprise:

dividing, by the resource management module, multiple physical network port resources of the plurality of stream media service units into logic minimum resources that are used by both the channel service and the service on demand;

applying, by the channel management module, to the resource management module for the channel resource required by the channel service according to the instruction of creating a channel from a Media Location Service System (MLSS), and performing control interaction on the stream media service unit where the channel resource is located;

the step of obtaining the resource on demand required by the service on demand, and performing control interaction on the stream media service unit where the resource on demand is located may comprise:

receiving and analyzing, by the user management module, an RTSP request sent by a Set Top Box (STB), applying to the resource management module for the resource on demand required by the service on demand of a user according to the RTSP request, and performing control interaction on the stream media service unit where the resource on demand is located.

Preferably, the stream media service unit may comprise: a media control module, a media source analyzing module, a media source control module and a media output control module; the method may further comprise:

analyzing and pre-processing, by the media source analyzing module, a Universal Resource Identifier (URI) to obtain code stream data of the URI, the URI of the channel service is a Session Description Protocol (SDP) description, and the URI of the service on demand is a local file;

controlling, by the media source control module, the code stream data analyzed by the media source analyzing module;

copying, by the media output control module, the code stream data outputted by the media source control module for each media output, and sending it to a specified media output;

performing, by the medial control module, message interaction with the channel management module and the user management module in the service processing unit.

Preferably, type of the media output may comprise: live broadcast user/service-on-demand user, stream media service unit or storage of file.

Preferably, the step of controlling by the media source control module the code stream data analyzed by the media source analyzing module may comprise:

for the code stream data analyzed by the media source analyzing module, converting, by the media source control module, a type of the code stream data, adding additional function of the code stream data, or controlling play of the code stream data.

Preferably, when it is needed to create a channel, the step of performing control interaction on the stream media service unit where the channel resource is located may comprise:

operating, by the media control module, the media source analyzing module to create a new media source, setting attributes of the media source, and recording an identifier of the newly-created media source;

operating, by the media control module, the media output control module when the channel management module brings output end information into the media control module, to create a new corresponding output, each output is provided with an output identifier and belongs to the created media source;

operating, by the media control module, the media source control module according to the identifier of the newly-created media source, to control the media source control module to start receiving a channel external code stream or reading a channel default file.

Preferably, when a live broadcast user is hung under the created channel, the method may further comprise:

sending, by the STB, the RTSP request for user play to the user management module, wherein the RTSP request may comprise: user information and an identifier of the channel where the user is located;

obtaining, by the user management module, resource for the live broadcast user, and obtaining the identifier of the media source of the created channel according to the identifier of the channel;

sending, by the user management module, a notification message of adding a user to the media control module, wherein the notification message of adding a user may comprise: user information, and the identifier of the media source of the channel;

operating, by the media control module, the media output control module to create a new external user output, and an identifier of media source corresponding to the external user output is the identifier of the media source of the channel.

The step of performing control interaction on the stream media service unit where the resource on demand is located may comprise:

operating, by the media control module, the media source analyzing module to create a new media source, setting attributes of the media source, and recording an identifier of the newly-created media source;

operating, by the media control module, the media output control module when the user management module brings output end information into the media control module, to create a new corresponding output, each output is provided with an output identifier and belongs to the created media source;

operating, by the media control module, the media source control module according to the identifier of the newly-created media source, to control the media source control module to start reading a file and controlling play rate and packet rate.

Preferably, when the stream media service unit where the channel service is located has no resource on demand to provide a service or has a higher load, the method may further comprise:

finding, by the channel management module, the stream media service unit where the channel service is located from the resource management module, and applying to the stream media service unit for an internal user resource;

notifying, by the channel management module, the media control module of adding an internal user;

operating, by the media control module, the media output control module to add an output, wherein an type of the output is an internal user, the output is hung under the media source of the channel and outputted to another stream media service unit which prepares to create a temporary channel;

generating, by the channel management module, an SDP file, and interacting with a media control module on the another stream media service unit which prepares to create a temporary channel to create a same channel.

Preferably, when channel code stream is interrupted accidentally, the method may further comprise:

reporting, by the media source control module, to the media control module after detecting the interruption of the channel code stream;

reporting, by the media control module, the abnormity of interruption of the channel code stream to the channel management module;

transmitting, by the channel management module, a media source replacing message to the media control module after receiving a message of external code stream interruption; the URI of the media source is changed from an external code stream SDP description to a new URI of default file path;

transmitting, by the media control module, a media source switching message to the media source analyzing module.

The present invention further provides a unified management system for channel service as well as service on demand of stream media, wherein the system comprises a service processing unit and a plurality of stream media service units, wherein the service processing unit is configured to receive an instruction of creating a channel, obtain channel resource required by a channel service from a stream media service unit according to the instruction of creating a channel, and perform control interaction on the stream media service unit where the channel resource is located;

the service processing unit is configured to receive an RTSP request, obtain resource on demand required by a service on demand according to the RTSP request, and perform control interaction on a stream media service unit where the resource on demand is located.

Preferably, the service processing unit may comprise: a resource management module, a channel management module and a user management module, wherein the resource management module may be configured to divide multiple physical network port resources of the plurality of stream media service units into logic minimum resources that are used by both the channel service and the service on demand;

the channel management module may be configured to apply to the resource management module for the channel resource required by the channel service according to the received instruction of creating a channel, and perform control interaction on the stream media service unit where the channel resource required by the channel service is located;

the user management module may be configured to receive and analyzing the RTSP request sent an STB, apply to the resource management module for the resource required by the service on demand of a user, and perform control interaction on the stream media service unit where the resource on demand required by the service on demand is located.

Preferably, the stream media service unit may comprise: a media control module, a media source analyzing module, a media source control module and a media output control module, wherein the media source analyzing module may be configured to analyze and pre-process a URI of the channel service or the service on demand to obtain code stream data of the URI;

the media source control module may be configured to control the code stream data analyzed by the media source analyzing module;

the media output control module may be configured to copy the code stream data outputted by the media source control module for each media output, and send it to a specified output;

the media control module may be configured to perform message interaction with the channel management module and the user management module in the service processing unit, and perform unified control and data association with the media source analyzing module, the media source control module and the media output control module.

At least one of the above technical solutions has the following beneficial effects: through performing control interaction by the service processing unit, with the stream media service unit where the channel resource or resource on demand are located according to the received instruction of creating a channel and the RTSP request, respectively, unified management of channel service and service on demand can be realized, so that merging and conversion of channel service and service on demand may be conveniently performed, and multi-level architecture of the Content Delivery Network (CDN) can be better implemented, which is beneficial to realizing upgrade expansion of services, thereby improving the service stability of the stream media system.

DETAILED DESCRIPTION

In an embodiment of the present invention, the unified resource management of channel service and service on demand may be realized through the following solution: a service processing unit receives an instruction of creating a channel, obtains channel resource required by a channel service from a stream media service unit according to the instruction of creating a channel, and performs control interaction on the stream media service unit where the channel resource is located; the service processing unit receives an RTSP request, obtains resource on demand required by a service on demand according to the RTSP request, and performs control interaction on the stream media service unit where the resource on demand is located.

In this embodiment, there is no strict time-sequence limitation on the process of 'obtaining channel resource required by a channel service from a stream media service unit according to the instruction of creating a channel, and performing control interaction on the stream media service unit where the channel resource is located' and the process of 'receiving an RTSP request by the service processing unit, obtaining resource on demand required by a service on demand according to the RTSP request, and performing control interaction on the stream media service unit where the resource on demand is located'.

To make the objective, technical solutions and advantages of the present invention more elucidated, the present invention will be further described in detail below with reference to embodiments and accompanying drawings. Here, the exemplary embodiments and explanation of the present invention are intended to explain the present invention, not to limit the present invention.

Figure 1:
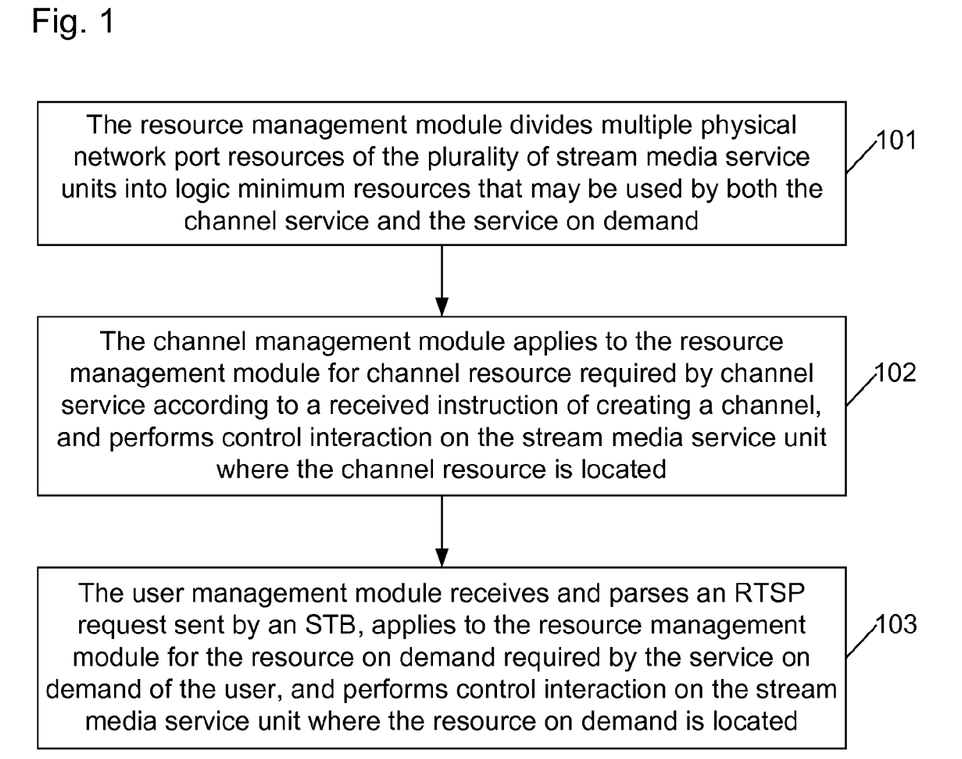
FIG. 1 shows a flowchart of a unified management method for channel service as well as service on demand of stream media according to an embodiment of the present invention.

FIG. 1 shows a flowchart of a unified management method for channel service as well as service on demand of stream media according to an embodiment of the present invention, which may be applied to a stream media system. The stream media system may comprise: a service processing unit and a plurality of stream media service units, wherein the service processing unit comprises a resource management module, a channel management module and a user management module, and the method comprises the following steps.

At step 101, the resource management module divides multiple physical network port resources of the plurality of stream media service units into logic minimum resources that may be used by both the channel service and the service on demand;

namely, the resource management module may divide the multiple physical network port resources of the plurality of stream media service units into logic minimum resources in the form of Internet protocol+port (IP+Port) range served by the Real-time Transport Protocol/Real-time Transport Control Protocol (RTP/RTCP); the logic minimum resources may be used by both the service on demand and channel service and realize load sharing according to the current occupied condition when providing service.

At step 102, the channel management module applies to the resource management module for channel resource required by channel service according to a received instruction of creating a channel, and performs control interaction on the stream media service unit where the channel resource is located.

At step 103, the user management module receives and analyzes an RTSP request sent by a set top box (STB), applies to the resource management module for the resource on demand required by the service on demand of the user, and performs control interaction on the stream media service unit where the resource on demand is located.

Step 102 and Step 103 are independent processes from each other. The initiator of creating a channel (Step 102) is on the operator side, while the initiator of the service on demand of a user (Step 103) is on the home user side. Thus, there is an order between the Step 102 and Step 103 only when the live broadcast user watches the channel, while they are not influenced by each other at other moments.

In the embodiment, the stream media service unit comprises: a media control module, a media source analyzing module, a media source control module and a media output control module, wherein the media source analyzing module analyzes and pre-processes a universal resource identifier (URI) to obtain the code stream data of the URI. For a channel service, the URI is generally a SDP (Session Description Protocol) description, and for the service on demand, the URI is generally a local file.

The media source control module performs control processing on the code stream data analyzed by the media source analyzing module. The control processing comprises: converting a type of the code stream data, adding additional function of the code stream data, or controlling play of the code stream data, wherein adding the additional function of code stream data refers to adding extension field to an RTP extension header to implement a specific function of the service; controlling play of code stream data refers to controlling the packet rate, play rate or play range.

The media output control module copies the code stream data outputted by the media source control module for each media output and sends it to a specified media output.

In the embodiment, the type of media output comprises: service-on-demand user/live broadcast user (which can be described as external user), stream media service unit (which can be described as internal user), and storage of file. Because a media source may comprise multiple media outputs, while a media output is of only one type and subordinate to one media source, different control mechanisms may be introduced according to different transmission types. Fast retransmission and the other control mechanisms may be introduced to the internal and external users, while various control processing such as file storage format, size, name and the like may be introduced to the storage of the file.

The media control module may perform message interaction with the channel management module and user management module in the service processing unit, and may cooperate with the media source analyzing module, the media source control module and the media output control module to implement unified control and data association.

It is seen from the above technical solution that, through implementing unified management for channel service as well as service on demand in the embodiment, merging and conversion of channel service and service on demand may be conveniently implemented, multi-level architecture of the content delivery network (CDN) may be better realized, and upgrade expansion of the service may be further conveniently realized, thereby improving the stability of services of the stream media system.

Figure 2:
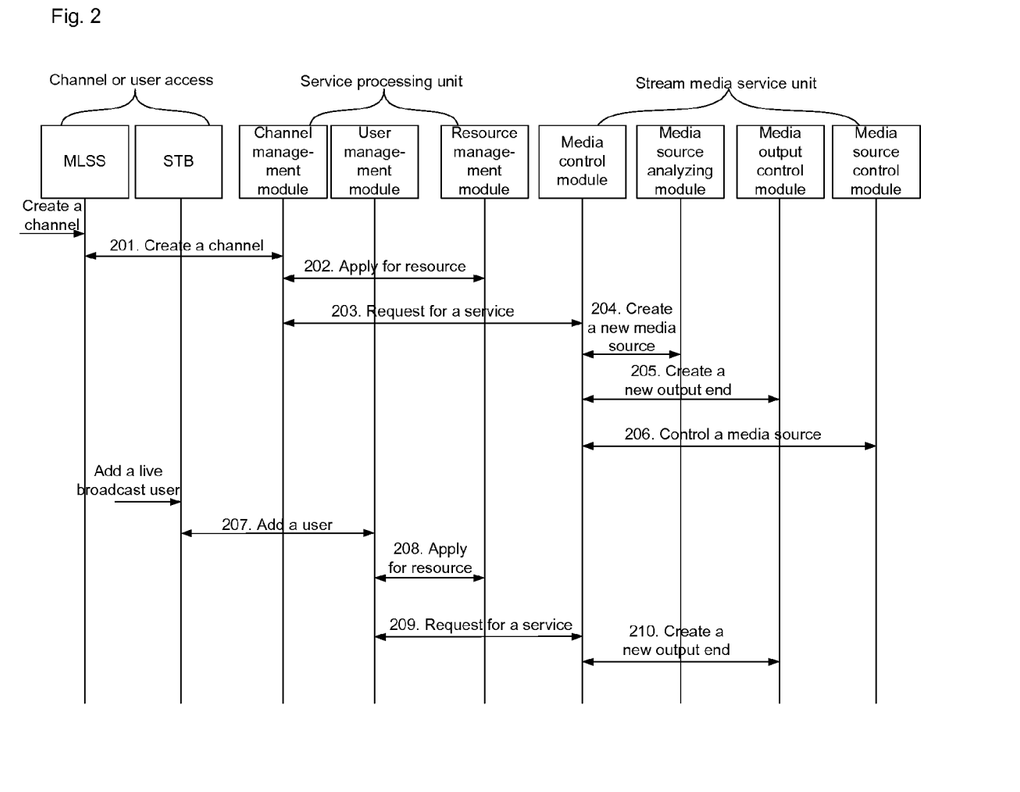
FIG. 2 shows a flowchart of a method for creating a channel and hanging a live broadcast user under the channel according to an embodiment of the present invention.

FIG. 2 shows a flowchart of a method for creating a channel and hanging a live broadcast user under the channel according to an embodiment of the present invention, namely, when it is needed to create a channel, the performing control interaction on the stream media service unit where the channel resource is located comprises the following steps.

At step 201, a media location service system (MLSS) transmits a command of creating a channel to the channel management module in the service processing unit;

the command of creating a channel comprises: related information of the channel, such as channel identifier, channel type, channel Service Discovery Protocol (SDP) and the like.

At step 202, the channel management module obtains channel resource capable of providing service from the resource management module.

At step 203, according to the obtained channel resource, the channel management module is positioned to a stream media service unit where the channel resource is located, and interacts with the media control module of the stream media service unit to request for providing a service;

the message of requesting for providing service comprises: media source information, media source control information, and of course, media output information.

At step 204, after receiving the request from the channel management module, the media control module operates the media source analyzing module to create a new media source, sets attributes of the media source, such as service priority and the like, and records an identifier of the media source in data area.

At step 205, when the channel management module brings output end information into the media control module, the media control module operates the media output control module to create a new corresponding media output, each media output is provided with an output identifier and belongs to the identifier of the media source in Step 204. The attributes of the output end are also set. If it is a time-shift file storage, format and type of the file and the like should be specified; and if it is an internal user, it should be specified whether retransmission is needed and local and remote RTP/RTCP resource occupation information of streamed track and the like.

At step 206, the media control module operates the media source control module according to the identifier of the media source, to control the media source control module to start receiving a channel external code stream or reading a channel default file;

in this step, the transcoding of the media code stream may also be controlled, or special extension information may be added into the RTP extension header to facilitate expansion of other services, or redundant error correction coding (such as forward error correction (FEC)) and the like are performed; the processed code stream is pushed to the output end; so far, the creation of the channel is completed.

Continuing to refer to FIG. 2, the flow of the method for hanging live broadcast user under the channel in the embodiment of the present invention comprises:

At step 207, the STB sends an RTSP request for user play to the user management module in the service processing unit, wherein the RTSP request comprises: user information and an identifier of the channel where the user is located.

At step 208, the user management module obtains the resource for the live broadcast user from the resource management module and obtains the related information of the created channel according to the identifier of the channel; the related information of the created channel comprises the identifier of the media source of the channel;

in this step, when the resource management module allocates the live broadcast user resource, it firstly allocates the resource of the stream media service unit where the channel is located. If the resource of stream media service unit where the channel is located has no user resource available to provide the service or has a higher load, a temporary channel has to be created on the stream media service unit of other user selectable resource.

At step 209, the user management module interacts with the media control module of the stream media service unit where the user resource is located, sends a notification message of adding a user to the media control module to inform the media control module of adding the user; the notification message comprises: user-related information, and the identifier of the media source of the channel.

At step 210, the media control module operates the media output control module to create a new external user output, and an identifier of media source corresponding to the external user output is the identifier of the media source of the created channel.

So far, the live broadcast user is successfully added.

Figure 3:
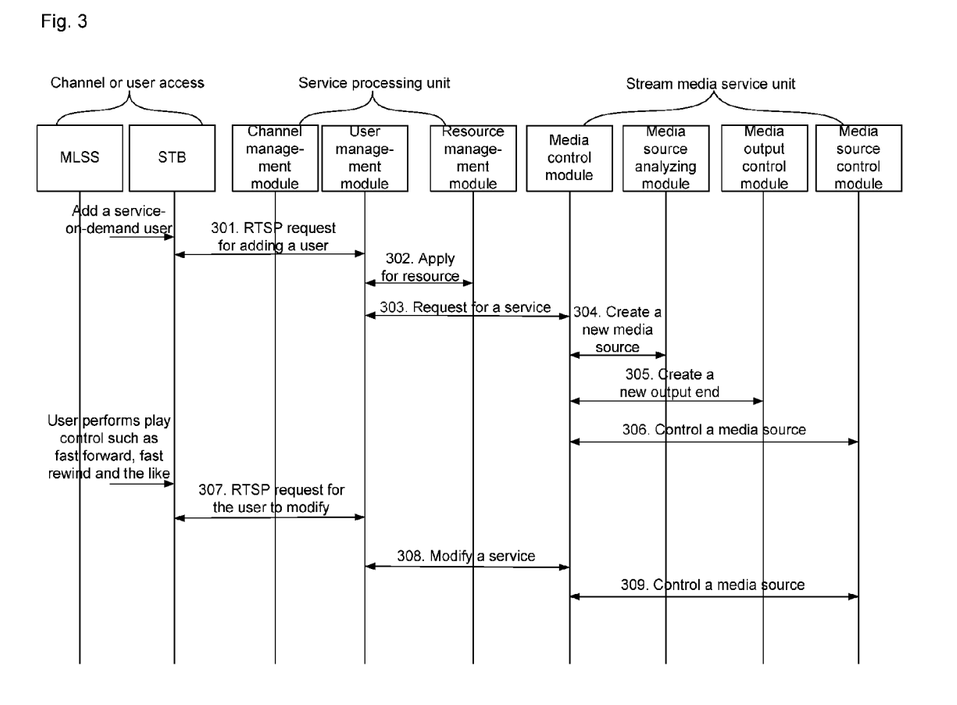
FIG. 3 shows a flowchart of a method for service-on-demand user according to an embodiment of the present invention.

FIG. 3 shows a flowchart of a method for service-on-demand user according to an embodiment of the present invention; namely, performing control interaction on the stream media service unit where the resource on demand is located comprises the following steps.

At step 301, the STB sends an RTSP request for user play to the user management module in the service processing unit;

the RTSP request for user play comprises user information.

At step 302, the user management module obtains the resource for the service-on-demand user from the resource management module.

At step 303, according to the obtained resource for the service-on-demand user, the user management module is positioned to the stream media service unit where the resource locates and interacts with the media control module of the stream media service unit for requesting for providing a service.

At step 304, after receiving the request from the user management module, the media control module operates the media source analyzing module to create a new media source, sets the attributes of the media source, such as service priority and the like, and records an identifier of the media source in data area.

Step 305, when the user management module brings output end information into the media control module, the media control module operates the media output control module to create a new corresponding media output, each media output is provided with an output identifier and belongs to the identifier of the media source in Step 304. The attributes of the output end are also set. If it is a time-shift file storage, format and type of the file and the like should be specified; and if it is the internal user, it should be specified whether retransmission is needed and local and remote RTP/RTCP resource occupation information of streamed track and the like.

At step 306, the media control module operates the media source control module according to the identifier of the media source, to control the media source control module to start reading the file and control the play rate and packet rate.

Continuing to refer to FIG. 3, it shows a method flow when the service-on-demand user performs the operation such as fast forward, fast rewind or positioning play and the like in the embodiment, and the method comprises the following steps.

At step 307, the STB sends an RTSP request from the user for performing fast forward, fast rewind or positioning play to the user management module.

At step 308, the user management module sends a request for modifying the service to the media control module.

At step 309, the media control module sends the media source control module a message for modifying media source control to modify the play rate or play initial position and the like.

Figure 4:
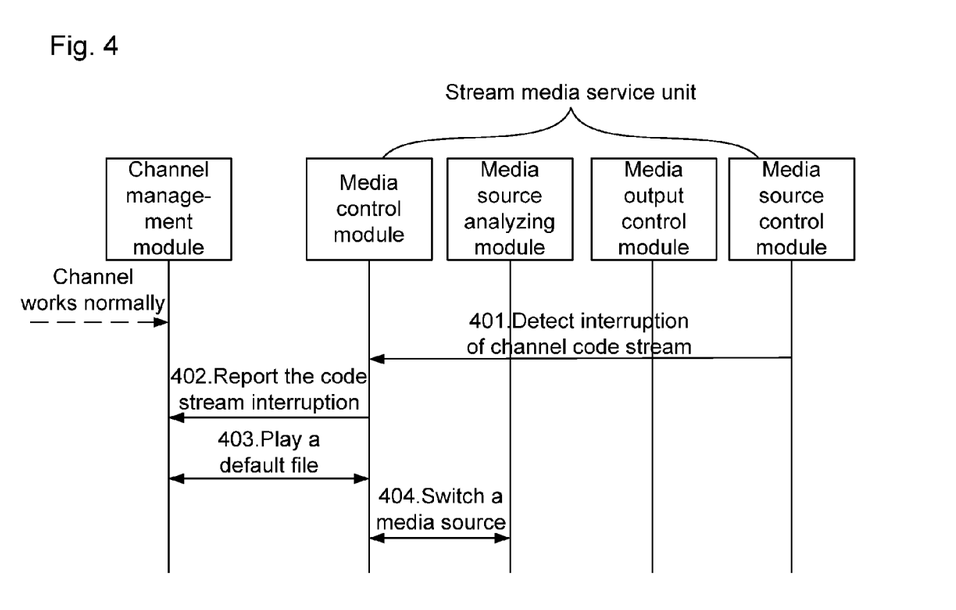
FIG. 4 shows a flowchart of a method for switching media source upon interruption of channel code stream according to an embodiment of the present invention.

When the channel code stream is interrupted, FIG. 4 shows a flowchart of a method for switching media source upon interruption of channel code stream according to an embodiment of the present invention, and the method comprises the following steps.

At step 401, the media source control module reports to the media control module after detecting the interruption of the channel code stream;

At step 402, the media control module reports the abnormity of interruption of the channel code stream to the channel management module;

At step 403, after receiving a message of external code stream interruption, the channel management module transmits a media source replacing message to the media control module; the URI of the media source is changed from the external code stream SDP description to a new URI of default file path.

At step 404, the media control module transmits a media source switching message to the media source analyzing module. So far, the flow of playing a default file upon code stream interruption is completed.

Flows, such as play scheduling, carousel channel and the like in the embodiment are similar to the flows in FIG. 4, which will not be described in detail here, and the convenience of service diversification or expansion on this basis could be appreciated therefrom.

Figure 5:
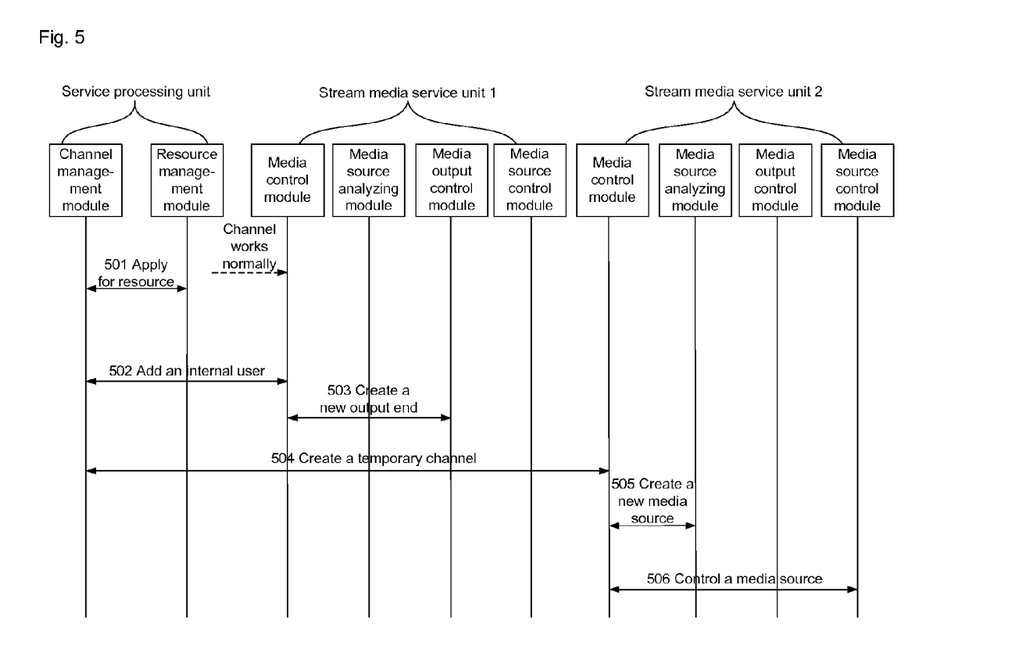
FIG. 5 shows a flowchart of a method for creating a temporary channel according to an embodiment of the present invention.

FIG. 5 shows a flowchart of a method for creating a temporary channel according to an embodiment of the present invention. The method comprises the following steps.

At step 501, the channel management module finds a stream media service unit 1 where the channel is located from the resource management module, and applies to the stream media service unit 1 for internal user resource;

At step 502, the channel management module informs the media control module of adding an internal user;

At step 503, the media control module operates the media output control module to add an output, wherein the type of the output is internal user, the output is hung under the media source of the channel and outputted to stream media service unit 2 which prepares to create a temporary channel;

At step 504, the channel management module generates an SDP file, and interacts with a media control module on the stream media service unit 2 which prepares to create a temporary channel to create a same channel;

At step 505, after receiving the request from the channel management module, the media control module operates the media source analyzing module to create a new media source and set the attributes of the media source, such as service priority and the like, and record an identifier of the media source in data area;

At step 506, the media control module operates the media source control module according to the identifier of the media source to control the media source control module to start receiving a channel external code stream or reading a channel default file;

in this step, the transcoding of the media code stream may also be controlled, or special extension information may be added into the RTP extension header to facilitate expansion of other services, or redundant error correction coding (such as FEC) and the like are performed; the processed code stream is pushed to the output end; so far, the creation of the channel is completed.

The creation of the temporary channel is applied to the circumstance where the stream media service unit where the channel service is located has no resource on demand to provide a service or has a higher load.

Figure 6:
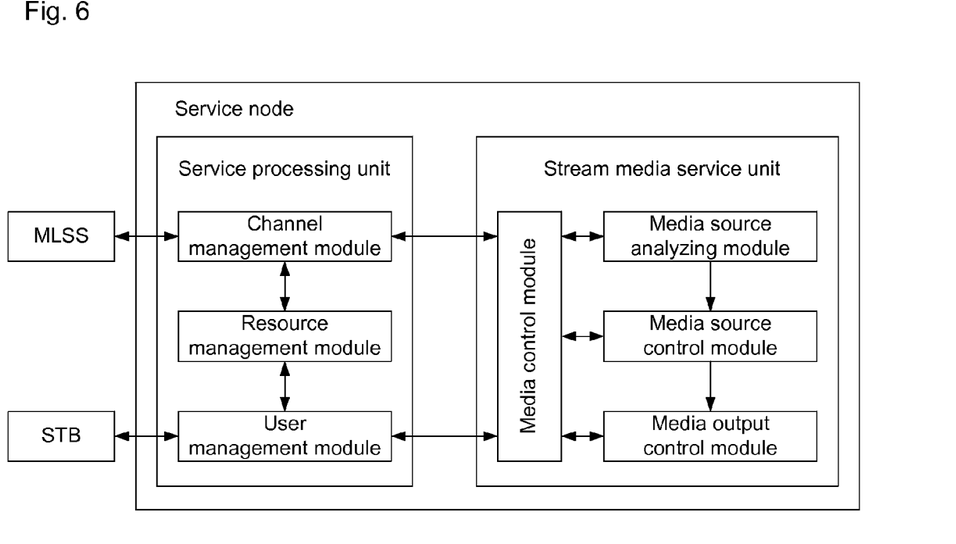
FIG. 6 shows a structural diagram of a unified management system for channel service as well as service on demand of stream media according to an embodiment of the present invention.

FIG. 6 shows a structural diagram of a unified management system for channel service as well as service on demand of stream media according to an embodiment of the present invention. The system comprises a MLSS, a plurality of STBs and a plurality of CDN service nodes, wherein the CDN service nodes may be central nodes or edge nodes, and each CDN service node comprises a service processing unit and a plurality of stream media service units, wherein the service processing unit is configured to receive an instruction of creating a channel, obtain a channel resource required by the channel service from the stream media service unit according to the instruction of creating a channel, and perform control interaction on the stream media service unit where the channel resource is located; and the service processing unit is configured to receive an RTSP request, obtain a resource on demand required by the service on demand according to the RTSP request, and perform control interaction on the stream media service unit where the resource on demand is located.

With reference to FIG. 6, the service processing unit is configured to interact with the MLSS and STB, the service processing unit is a hub for external signaling interaction. The service processing unit may be configured to manage the plurality of stream media service units, comprising the management of resource and service. In this embodiment, the service processing unit comprises a resource management module, a channel management module, and a user management module.

In this embodiment, the resource management module is configured to divide multiple physical network port resources of the plurality of stream media service units into logic minimum resources that may be used by both the channel service and the service on demand;

namely, the resource management module firstly divides the plurality of stream media service units into stream media service unit 1, stream media service unit 2, . . . , stream media service unit n; then divides the multiple physical media network ports of each stream media service unit into subunit 1, subunit 2, . . . , subunit n; and finally divides each network port into a plurality of circuits, namely circuit 1, circuit 2, . . . , circuit n according to the minimum streamed track port range occupied by one path of user; thereby, the specific port range of a specific network port of a stream media service unit is a minimum logic resource. The logic resource is unified to the channel service and service on demand.

A common channel occupies one resource to receive the code stream, and it needs to occupy one resource to transmit the code stream when one live broadcast user is hung under the channel. The service-on-demand user also needs to occupy one resource to transmit the code stream. Thus, the channel service and the service on demand can occupy the same type of resource, and the difference of resources is shielded by them. Furthermore, in the actual provision of resource, rational load sharing of resources may be realized based on a certain algorithm.

The channel management module is configured to apply to the resource management module for channel resource required by channel service according to a received instruction of creating a channel, and perform control interaction on the stream media service unit where the channel resource is located;

namely, the channel management module provides unified management of the channels of the entire service nodes, implements application and release of the channel resource, and implements channel-related signaling interaction such as channel creation, channel deletion and the like in cooperation with the MLSS and the stream media service unit.

The user management module is configured to receive and analyze an RTSP request sent by STB, apply to the resource management module for resource on demand required by service on demand of the user, and perform control interaction on the stream media service unit where the resource on demand is located.

Namely, the user management module provides unified management of users of the entire nodes, implements application and release of the user resource, wherein the user comprises live broadcast users hung under the channel and various forms of service-on-demand users. It implements signaling interaction, such as user creation, operation in the user play process, user deletion and the like in cooperation with the STB and the stream media service unit.

Figure 7:
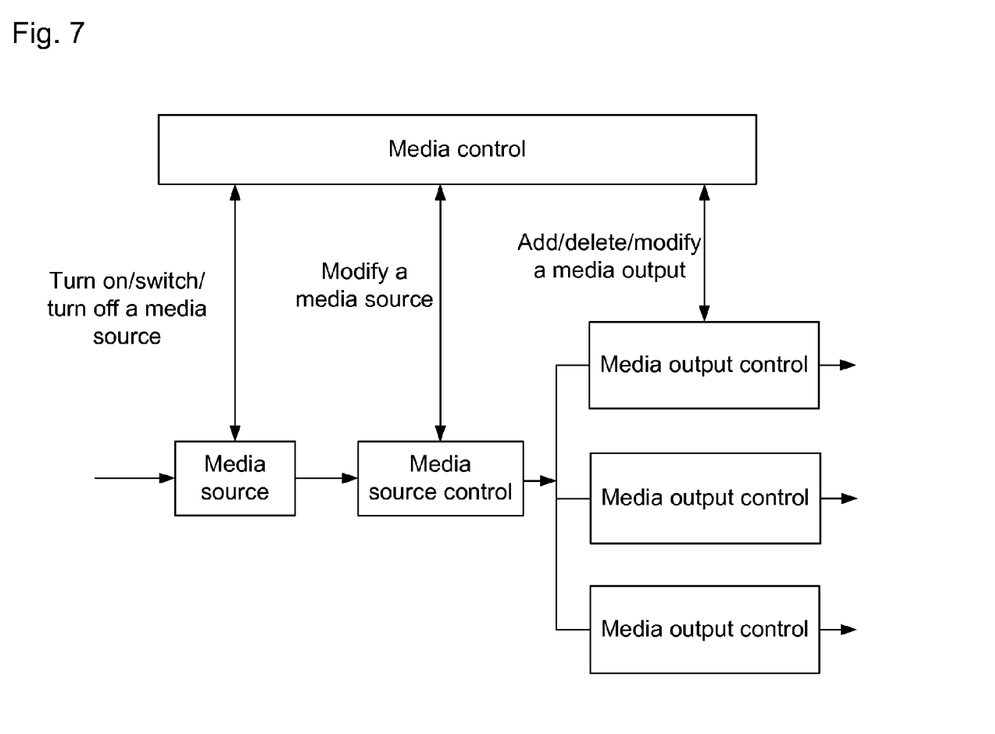
FIG. 7 shows a schematic diagram of control and media relations among the modules in a media service unit according to an embodiment of the present invention.

In the embodiment, the stream media service unit comprises a media control module, a media source analyzing module, a media source control module and a media output control module. FIG. 7 shows a schematic diagram of control and media relations among the modules according to an embodiment of the present invention.

The media control module is configured to perform message interaction with the channel management module and user management module in the service processing unit, and implement unified control and data association with the media source analyzing module, the media source control module and the media output control module.

Namely, the media control module is configured to perform message interaction with the channel management module and user management module of the service processing unit. When it interacts with the above two modules, it does not discriminate specific services, but just carries basic information of the service, such as media source information, source control information, output information and the like. After receiving the above information, the media control module implements setting and unified association control for the media source analyzing module, the media source control module and the media output control module.

As shown in FIG. 7, the media control modules controls turning on/switching/turning off the media source.

The media source analyzing module is configured to analyze and pre-process the URI to obtain the code stream data of the URI;

namely, the media source analyzing module is configured to analyze and pre-process the URI of the media source to obtain basic code stream characteristics of the URI. One service has only one media source and only one URI. Each media source has one identifier, which acts as the media source index of the media control module and establishes an association with the occupied resource. The URI is generally SDP description for the channel, and the identifier of the media source is in a one-to-one correspondence to the resource occupied by the channel code stream, while the media source of the live broadcast user hung under the channel is consistent with the media source of the channel to which it belongs. URI is generally a local file for a service on demand, and each service-on-demand user has only one media source, which is in a one-to-one correspondence to the resource occupied for sending user code stream.

The media output control module is configured to copy the code stream data outputted by the media source control module for each media output, and send it to the specified output;

namely, the media output control module copies a code stream from the media source control module for each media output, and sends it to a specified output. The output may be of various types, such as live broadcast/service-on-demand user, storage of file and the like.

As shown in FIG. 7, the media control module controls the media output control module to add/delete/modify the media output.

The media source control module is configured to control the code stream data analyzed by the media source analyzing module;

namely, the media source control module controls the code stream data analyzed by the media source analyzing module which belongs to the media source, and pushes it to all the outputs belonging to the media source. The control may mainly be transcoding, namely the converting the type of the code stream; adding an additional function to the code stream, such as adding an extension field to an RTP extension header to realize the specific function of the service; or performing redundant error correction coding (such as FEC); controlling play of code stream, such as controlling packet rate, play rate or play range and the like. The media source control module should report timely the abnormity of current file-read, abnormal interruption of the code stream and the like to the media control module, report timely the file-read from the beginning to the end, and make statistics on the quality of the source code stream.

As shown in FIG. 7, the media control module controls the media source control module to modify the media source.

The above is only preferred embodiments of the present invention. It should be noted that, those skilled in the art may make various improvements and modifications without departing from the principle of the present invention, and these improvements and modifications should be considered within the protection scope of the present invention.

The invention claimed is:

1. A unified management method for channel service as well as service on demand of stream media, which is applied to a stream media system comprising a service processing unit and a plurality of stream media service units, wherein the service processing unit comprises: a resource management module, a channel management module and a user management module, and the stream media service unit comprises: a media control module, a media source analyzing module, a media source control module and a media output control module, the method comprising:

receiving, by the service processing unit, an instruction of creating a channel, obtaining channel resource required by a channel service from a stream media service unit according to the instruction of creating a channel, and performing control interaction on the stream media service unit where the channel resource is located, thus creating the channel which is used for the channel service related to a live program;

receiving, by the service processing unit, a Real Time Streaming Protocol (RTSP) request, obtaining resource on demand required by a service on demand according to the RTSP request, and performing control interaction on a stream media service unit where the resource on demand is located;

wherein the step of obtaining the channel resource required by the channel service and performing control interaction on the stream media service unit where the channel resource is located comprises:

dividing, by the resource management module, multiple physical network port resources of the plurality of stream media service units into logic minimum resources that are used by both the channel service and the service on demand;

applying, by the channel management module, to the resource management module for the channel resource required by the channel service according to the instruction of creating a channel from a Media Location Service System (MLSS), and performing control interaction on the stream media service unit where the channel resource is located;

the step of obtaining the resource on demand required by the service on demand, and performing control interaction on the stream media service unit where the resource on demand is located comprises:

receiving and analyzing, by the user management module, an RTSP request sent by a Set Top Box (STB), applying to the resource management module for the resource on demand required by the service on demand of a user according to the RTSP request, and performing control interaction on the stream media service unit where the resource on demand is located;

the method further comprising:

analyzing and pre-processing, by the media source analyzing module, a Universal Resource Identifier (URI) to obtain code stream data of the URI, the URI of the channel service is a Session Description Protocol (SDP) description, and the URI of the service on demand is a local file;

controlling, by the media source control module, the code stream data analyzed by the media source analyzing module;

copying, by the media output control module, the code stream data outputted by the media source control module for each media output, and sending it to a specified media output;

performing, by the media control module, message interaction with the channel management module and the user management module in the service processing unit;

wherein the step of performing control interaction on the stream media service unit where the resource on demand is located comprises:

operating, by the media control module, the media source analyzing module to create a new media source, setting attributes of the media source, and recording an identifier of the newly-created media source;

operating, by the media control module, the media output control module when the user management module brings output end information into the media control module, to create a new corresponding output, each output is provided with an output identifier and belongs to the created media source;

operating, by the media control module, the media source control module according to the identifier of the newly-created media source, to control the media source control module to start reading a file and control play rate and packet rate;

wherein when channel code stream is interrupted accidentally, the method further comprising:

reporting, by the media source control module, to the media control module after detecting the interruption of the channel code stream;

reporting, by the media control module, the abnormity of interruption of the channel code stream to the channel management module;

transmitting, by the channel management module, a media source replacing message to the media control module after receiving a message of external code stream interruption; the URI of the media source is changed from an external code stream SDP description to a new URI of default file path;

transmitting, by the media control module, a media source switching message to the media source analyzing module.

2. The method according to claim 1, wherein type of the media output comprises: live broadcast user/service-on-demand user, stream media service unit or storage of file.

3. The method according to claim 1, wherein the step of controlling by the media source control module the code stream data analyzed by the media source analyzing module comprises:

for the code stream data analyzed by the media source analyzing module, converting, by the media source control module, a type of the code stream data, adding additional function of the code stream data, or controlling play of the code stream data.

4. The method according to claim 1, wherein when it is needed to create a channel, the step of performing control interaction on the stream media service unit where the channel resource is located comprises:

operating, by the media control module, the media source analyzing module to create a new media source, setting attributes of the media source, and recording an identifier of the newly-created media source;

operating, by the media control module, the media output control module when the channel management module brings output end information into the media control module, to create a new corresponding output, each output is provided with an output identifier and belongs to the created media source;

operating, by the media control module, the media source control module according to the identifier of the newly-created media source, to control the media source control module to start receiving a channel external code stream or reading a channel default file.

5. The method according to claim 4, wherein when a live broadcast user is hung under the created channel, the method further comprises:

sending, by the STB, the RTSP request for user play to the user management module, wherein the RTSP request comprises: user information and an identifier of the channel where the user is located;

obtaining, by the user management module, resource for the live broadcast user, and obtaining the identifier of the media source of the created channel according to the identifier of the channel;

sending, by the user management module, a notification message of adding a user to the media control module, wherein the notification message of adding a user comprises: user information, and the identifier of the media source of the channel;

operating, by the media control module, the media output control module to create a new external user output, and an identifier of media source corresponding to the external user output is the identifier of the media source of the channel.

6. The method according to claim 1, wherein when the stream media service unit where the channel service is located has no resource on demand to provide a service or has a higher load, the method further comprises:

finding, by the channel management module, the stream media service unit where the channel service is located from the resource management module, and applying to the stream media service unit for an internal user resource;

informing, by the channel management module, the media control module of adding an internal user;

operating, by the media control module, the media output control module to add an output, wherein an type of the output is an internal user, the output is hung under the media source of the channel and outputted to another stream media service unit which prepares to create a temporary channel;

generating, by the channel management module, an SDP file, and interacting with a media control module on the another stream media service unit which prepares to create a temporary channel to create a same channel.

7. A unified management system for channel service as well as service on demand of stream media, comprising: a service processing unit and a plurality of stream media service units, wherein the service processing unit comprises: a resource management module, a channel management module and a user management module, and the stream media service unit comprises: a media control module, a media source analyzing module, a media source control module and a media output control module, the service processing unit is configured to receive an instruction of creating a channel, obtain channel resource required by a channel service from a stream media service unit according to the instruction of creating a channel, and perform control interaction on the stream media service unit where the channel resource is located, thus creating the channel which is used for the channel service related to a live program;

the service processing unit is configured to receive an RTSP request, obtain resource on demand required by a service on demand according to the RTSP request, and perform control interaction on a stream media service unit where the resource on demand is located;

wherein the resource management module is configured to divide multiple physical network port resources of the plurality of stream media service units into logic minimum resources that are used by both the channel service and the service on demand;

the channel management module is configured to apply to the resource management module for the channel resource required by the channel service according to the received instruction of creating a channel, and perform control interaction on the stream media service unit where the channel resource required by the channel service is located;

the user management module is configured to receive and analyze the RTSP request sent an STB, apply to the resource management module for the resource required by the service on demand of a user, and perform control interaction on the stream media service unit where the resource on demand required by the service on demand is located;

wherein the media source analyzing module is configured to analyze and pre-process a URI of the channel service or the service on demand to obtain code stream data of the URI;

the media source control module is configured to control the code stream data analyzed by the media source analyzing module;

the media output control module is configured to copy the code stream data outputted by the media source control module for each media output, and send it to a specified output;

the media control module is configured to perform message interaction with the channel management module and the user management module in the service processing unit, and perform unified control and data association with the media source analyzing module, the media source control module and the media output control module;

wherein the operation that the user management module performs control interaction on the stream media service unit where the resource on demand is located comprises:

the media control module is configured to operate the media source analyzing module to create a new media source, set attributes of the media source, and record an identifier of the newly-created media source;

the media control module is configured to operate the media output control module when the user management module brings output end information into the media control module, to create a new corresponding output, each output is provided with an output identifier and belongs to the created media source;

the media control module is configured to operate the media source control module according to the identifier of the newly-created media source, to control the media source control module to start reading a file and control play rate and packet rate;

wherein when channel code stream is interrupted accidentally, the media source control module is configured to report to the media control module after detecting the interruption of the channel code stream;

the media control module is configured to report the abnormity of interruption of the channel code stream to the channel management module;

the channel management module is configured to transmit a media source replacing message to the media control module after receiving a message of external code stream interruption; the URI of the media source is changed from an external code stream SDP description to a new URI of default file path;

the media control module is configured to transmit a media source switching message to the media source analyzing module.

8. The method according to claim 2, wherein the step of controlling by the media source control module the code stream data analyzed by the media source analyzing module comprises:

for the code stream data analyzed by the media source analyzing module, converting, by the media source control module, a type of the code stream data, adding additional function of the code stream data, or controlling play of the code stream data.

* * * * *